US007011513B2

(12) United States Patent
Russell

(10) Patent No.: US 7,011,513 B2
(45) Date of Patent: Mar. 14, 2006

(54) APPARATUS FOR CLEANING OPHTHALMIC COMPONENTS

(75) Inventor: Todd Aldridge Russell, Grayson, GA (US)

(73) Assignee: Novartis AG, Basel (CH)

( * ) Notice: Subject to any disclaimer, the term of this patent is extended or adjusted under 35 U.S.C. 154(b) by 161 days.

(21) Appl. No.: 10/630,428

(22) Filed: Jul. 30, 2003

(65) Prior Publication Data

US 2004/0022889 A1 Feb. 5, 2004

Related U.S. Application Data

(62) Division of application No. 10/283,718, filed on Oct. 30, 2002, now Pat. No. 6,783,603, which is a division of application No. 09/409,759, filed on Sep. 30, 1999, now Pat. No. 6,497,000.

(60) Provisional application No. 60/186,090, filed on Sep. 30, 1998.

(51) Int. Cl.
*B29D 11/00* (2006.01)

(52) U.S. Cl. ........................ 425/225; 425/808; 15/304; 15/345

(58) Field of Classification Search ................ 425/225, 425/808; 249/120; 15/303, 304, 209.2, 15/345, 346

See application file for complete search history.

(56) References Cited

U.S. PATENT DOCUMENTS

| | | | | |
|---|---|---|---|---|
| 4,629,409 A | | 12/1986 | Satoh et al. | 425/139 |
| 4,981,634 A | | 1/1991 | Maus et al. | 264/102 |
| 5,080,839 A | | 1/1992 | Kindt-Larsen | 264/2.6 |
| 5,094,609 A | | 3/1992 | Kindt-Larsen | 425/445 |
| 5,141,430 A | | 8/1992 | Maus et al. | 425/556 |
| 5,160,668 A | | 11/1992 | Imus | 264/1.7 |
| 5,607,518 A | * | 3/1997 | Hoffman et al. | 134/31 |
| 5,636,647 A | * | 6/1997 | Keene et al. | 134/102.2 |

FOREIGN PATENT DOCUMENTS

| | | | |
|---|---|---|---|
| DE | 91 02 4991 4 | | 3/1992 |
| EP | 0 693 325 A2 | | 7/1995 |
| FR | 2 353 468 | | 6/1976 |
| GB | 2 253 271 A | | 9/1992 |
| JP | 55100112 | | 7/1980 |
| JP | 61-072633 | * | 4/1986 |
| WO | WO 95/01229 | | 1/1995 |

OTHER PUBLICATIONS

English abstract for JP 61-072633.*

* cited by examiner

*Primary Examiner*—Donald Heckenberg
(74) *Attorney, Agent, or Firm*—Jian S. Zhou

(57) ABSTRACT

The present invention discloses an apparatus for cleaning ophthalmic devices. The apparatus has a conveying system for transporting lens mold carriers to a cleaning station. The cleaning station has at least one movable cleaning assembly which is situated above the lens mold carrier and has a recess. When the cleaning assembly is lowered to the lens mold carrier, a substantially enclosed or enclosed cavity containing the lens mold is created by the carrier and the recess of the cleaning assembly. Compressed gas is injected into the cavity to dislodge any debris that may be present on the lens molds, and a vacuum is employed to remove gas and debris from the cavity.

5 Claims, 17 Drawing Sheets

APPARATUS FOR CLEANING OPHTHALMIC COMPONENTS

This application is a division of U.S. Ser. No. 10/283,718 filed Oct. 30, 2002, which now is U.S. Pat. No. 6,783,603, which is a division of U.S. Ser. No. 09/409,759 filed Sep. 30, 1999, which now is U.S. Pat. No. 6,497,000, which claims the benefit under 35 U.S.C. §119(e) of U.S. provisional Application No. 60/186,090 filed Sep. 30, 1998.

FIELD OF THE INVENTION

The invention relates to an apparatus for use in manufacturing ophthalmic components, such as contact lenses, and more particularly, to an apparatus for cleaning the molds used to form contact lenses.

The manufacture of ophthalmic components, for example contact lenses, is typically carried out in a large number of separate production steps. Very often these production steps must be carried out in an ultra-clean (i.e., inert and sterile) environment such as a "clean room". Each production step, for example the manufacture and transfer of intermediate components, the positioning of equipment, such as molds, or the operation of equipment, presents an opportunity for contamination of the ophthalmic component. The danger for contamination is especially acute in the manufacture of contact lenses. If the lens manufacturing process is contaminated or corrupted in any way, in most cases the finished lens must be discarded.

Contact lenses are generally manufactured in automated or semi-automated production processes. Lens molds consisting of base curve (convex) and front curve (concave) mold halves are transported on carriers through the production process. The molds are symmetrical and are fitted together to form a small crescent shaped mold cavity between the base curve and front curve molds. A lens is formed by introducing a monomer in the front curve mold and then sandwiching the monomer between the base curve and front curve molds. The monomer is then polymerized through heat treatment, light treatment or other polymerizing process, thus forming a lens. The lens is then removed from the molds for further treatment and is packaged for consumer use.

If either the base curve or front curve mold is contaminated in any way, the lens formed will contain a flaw, such as an uneven face, and will most likely have to be discarded. Therefore, great care is taken to clean the base curve and front curve molds prior to introducing the monomer to the front curve mold. Currently, the cleaning of the base curve and front curve molds is accomplished manually. Using a hand held compressed gas (i.e. nitrogen) gun, compressed gas is blown over the mold halves to remove any debris that may be present on the surface of the molds.

Manual cleaning is an inefficient method by which to clean equipment used in the manufacture of ophthalmic components, especially contact lens molds. Given that the majority of the manufacturing steps involved in the production of contact lenses are automated, the use of any manual cleaning method has the potential to damage equipment, reduce the quality of finished product or at a minimum reduce the efficiency of the overall manufacturing process. For example, lens molds typically travel through the contact lens manufacturing process on carriers which are designed to hold the molds securely throughout the process. If the lens molds are manually cleaned, they are susceptible to becoming misaligned in their carriers or contaminated through inadvertent human contact. A misaligned mold half could form a misaligned lens mold. Misaligned molds result in flawed contact lenses or in manufacturing downtime to either remove or repair the misaligned mold. Similarly, as a result of fatigue or inattention, a technician could inadvertently permit a contaminated mold to proceed through the contact lens manufacturing process, thus resulting in a defective contact lens that could be sold to consumers.

The need therefore exists for providing an apparatus for use in the manufacture of ophthalmic components, especially contact lenses, that cleans a desired intermediate component or part to prevent contamination of that part, yet overcomes the above-described disadvantages of manual cleaning methods. In particular, the novel apparatus permits the cleaning of contact lens molds to occur automatically, uniformly and concurrently with other manufacturing steps. The apparatus of the present invention allows for continuous operation, and thus makes more extensive automation of the manufacturing operation possible.

OBJECTS OF THE INVENTION

It is an object of this invention to provide an apparatus and method for cleaning ophthalmic devices, especially contact lens molds.

It is a further object of this invention to provide an apparatus to automate the cleaning of ophthalmic devices, especially contact lens molds.

It is a further object of this invention to provide an automated apparatus and method for the cleaning of contact lens molds that increases the efficiency of the contact lens manufacturing process.

SUMMARY OF THE INVENTION

All of the above and other objects are achieved by an apparatus for the cleaning of ophthalmic components, especially contact lens molds. In its simplest form, the apparatus includes an ophthalmic component carrier, a conveying means, such as a conveyor, for transporting the carrier, and a cleaning station to receive and clean the ophthalmic devices. The cleaning station includes at least one cleaning assembly that is mechanically lowered onto the top of the lens mold carrier. There are recesses formed in the cleaning assembly such that when the cleaning assembly is lowered the recesses and the carrier define a substantially enclosed cavity in which a lens mold is housed. Compressed gas is then injected into the cavity to dislodge any debris that may be on the lens mold. The cavity is subjected to a vacuum to remove any debris that may be present.

In a preferred embodiment, the apparatus includes at least one front curve lens mold carrier and at least one base curve lens mold carrier. The front curve lens mold carrier includes a front curve top plate and a front curve bottom plate attached to the top plate. The front curve bottom plate has a plurality of holes and receiving slots formed therein. The receiving slots engage receiving members (e.g. pins) located on the base curve mold to stabilize the mold during monomer polymerization. The front curve top plate also has a plurality of holes formed therein. The top plate holes are in axial alignment with the bottom plate holes thereby providing an opening completely through the carrier when the top plate and the bottom plate are connected to each other. The top plate hole is separated into two sections by a flange. A hollow piston, guided by the flange, travels up and down in the two sections of the top plate hole. The piston is supported by a spring housed in the second section of the top plate hole which rests upon the top surface of the bottom plate. The top plate also has two top plate receiving slots in axial alignment with the bottom plate receiving slots.

The preferred embodiment of the apparatus further includes at least one base curve lens mold carrier. The base curve lens mold carrier also has a plurality of holes formed therein. The holes formed in the base curve lens mold carrier are divided into a first (or top) section and a second (or bottom) section with the first section being larger in diameter than the second section. The base curve lens mold carrier also has a channel extending from the edge of the first section to the edge of the carrier which provides rotational alignment for the molds by engaging with a protrusion on the outer diameter of the mold flange. The base curve lens mold carrier also includes two raised receiving members (e.g. pins) which are in axial alignment with the receiving slots formed in the front curve lens mold carrier and which engage with the receiving slots to form a stable mold for manufacturing a contact lens. Preferably, the carriers are transported to the cleaning station on a conventional conveyor.

The cleaning station which receives the front curve and base curve lens mold carriers is essentially table-like and includes at least two cleaning assemblies suspended from the underside of the table that can be lowered onto the top of the lens mold carriers. Preferably, the cleaning station consists of four legs and two parallel cross support members attached to the upper portion of the legs. A mounting plate (the table top) is movably attached to both cross support members in a manner that allows the mounting plate to move (i.e. slide) in relation to the cross support members. At least two means for providing vertical movement, such as pneumatic cylinders, are attached to the bottom surface of the mounting plate. At least two connectors for connecting the lens mold cleaning assemblies to the pneumatic cylinders are attached to the bottom of the pneumatic cylinders.

At least one front curve lens mold cleaning assembly and one base curve lens mold cleaning assembly are attached to the connectors. Each of the cleaning assemblies includes a top plate, a middle plate, and a bottom plate. The bottom plate of each assembly has a number of recesses corresponding to the number of lens molds carried on the lens mold carrier. The bottom plate recesses are also formed such that they can be in axial alignment with the holes of each carrier.

Each of the top, middle and bottom plates has a plurality of holes and recesses arranged to form two channels of fluid communication through the cleaning assembly. In operation, the first channel allows compressed gas to flow through the assembly to be injected into the recesses formed in the bottom plate. The injected gas dislodges any debris that may be present on the lens molds. The second channel of fluid communication allows an external vacuum source to pull the gas and debris out of the recesses.

After the front curve and base curve lens molds are cleaned, the cleaning assemblies retract and the conveyor carries the lens mold carriers to subsequent stations in the contact lens manufacturing process.

DESCRIPTION OF THE PREFERRED EMBODIMENTS

Figure 1:
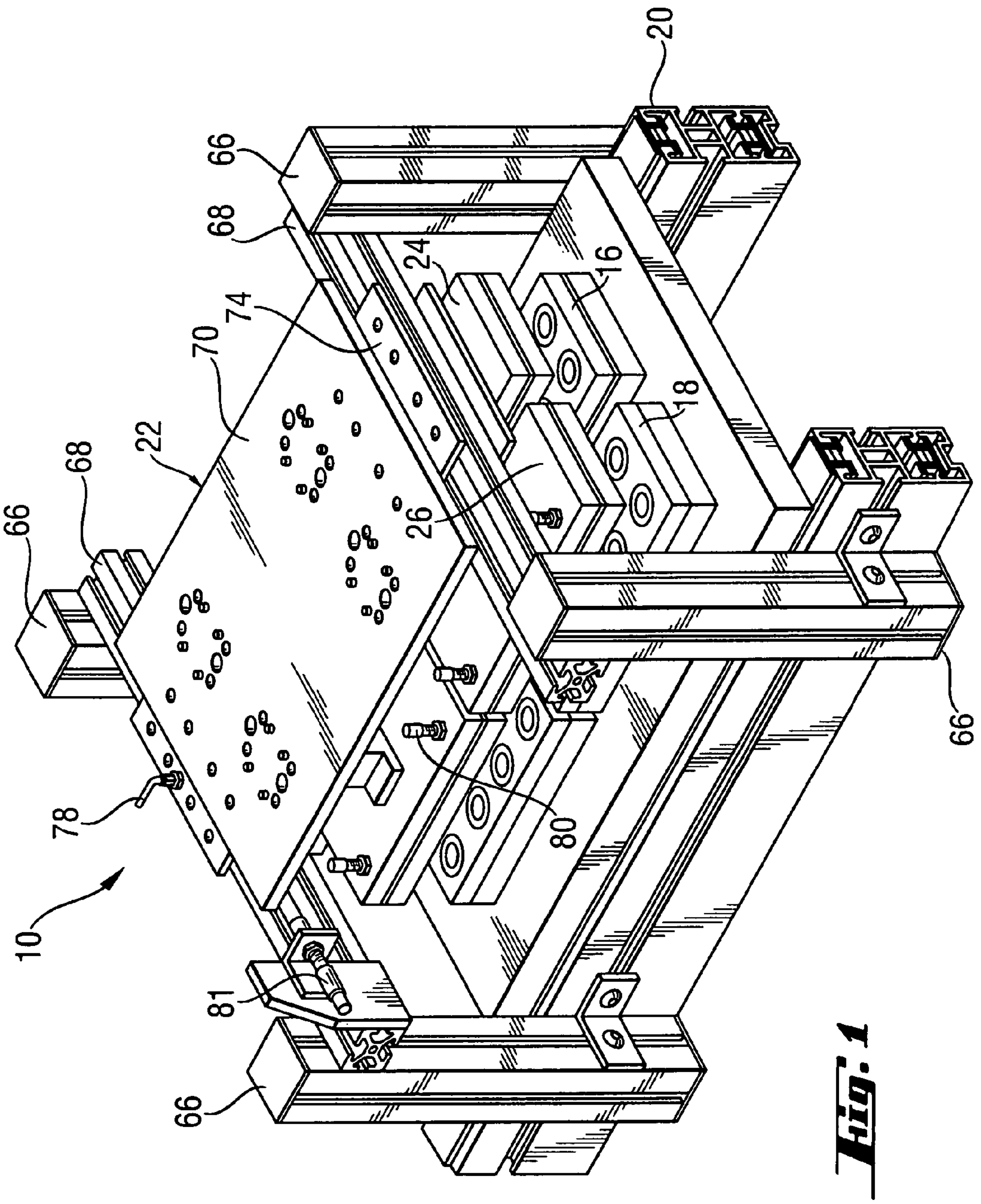
FIG. 1 is a perspective view of a preferred embodiment of an apparatus for use in manufacturing ophthalmic components according to the invention.

In the following description, like reference numerals designate like or corresponding parts throughout the several figures. It is to be also understood that such terms as "front", "rear", "side", "up", and "down" are used for purposes of locating one element relative to another and are not to be construed as limiting terms. Further, it should be understood that the illustrations are for the purpose of describing preferred embodiments of the invention, and thus are not intended to limit the invention in any manner.

Figure 7:
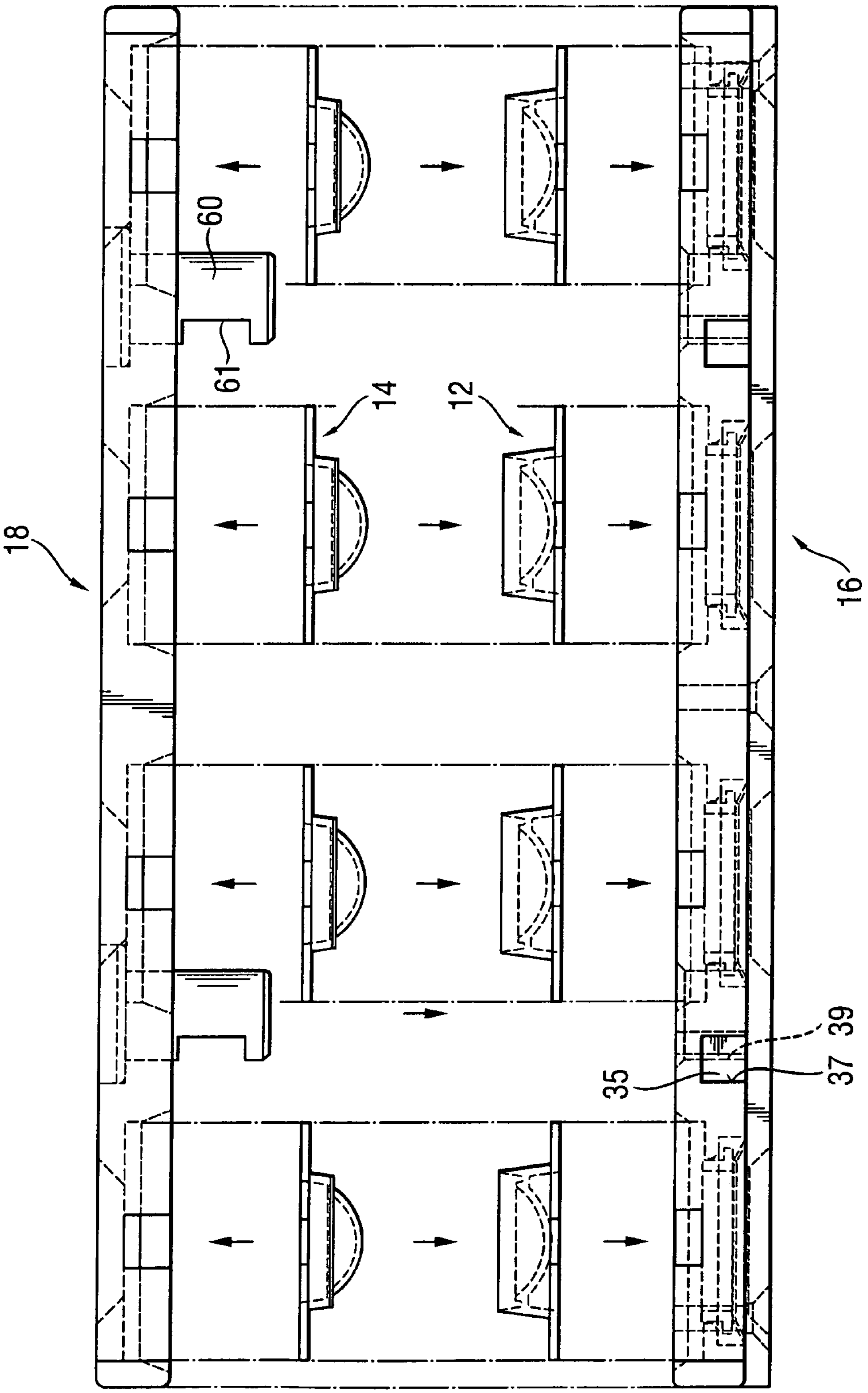
FIG. 7 is an elevation view showing how the front curve lens mold carrier and the base curve lens mold carrier join to form completed lens molds.

Referring now to the drawings, FIG. 1, is a perspective view of an apparatus, indicated generally at 10, for use in the manufacture of ophthalmic components, especially contact lenses. In particular, the apparatus 10 is a cleaning device designed to provide automated cleaning of contact lens molds. Contact lens molds typically have two parts: a front curve lens mold 12 and a base curve lens mold 14. FIG. 7. To manufacture a contact lens a polymerizable lens formulation is placed into the front curve lens mold. The base curve mold is then placed in contact with the front curve mold and the polymerizable formulation is allowed to polymerize.

The cleaning device 10 has a front curve lens mold carrier 16, a base curve lens mold carrier 18, a means for conveying the lens mold carriers 20, and a cleaning station 22. Preferably, the cleaning device 10 is designed such that it is capable of cleaning multiple front and base curve lens molds simultaneously. While the embodiment shown in the figures is designed to clean 16 front curve lens molds (2 sets of 8) and 16 base curve lens molds (2 sets of 8) it should be understood that the invention could be easily modified to create a device designed to clean any multiple of front or base lens molds. Similarly, the invention could easily be modified to clean lens molds arranged in circular carriers rather than in the rectangular carriers shown in the figures. The particular embodiment shown in the figures should not be viewed as limiting the scope of the invention or the claims.

Overview

Figure 6:
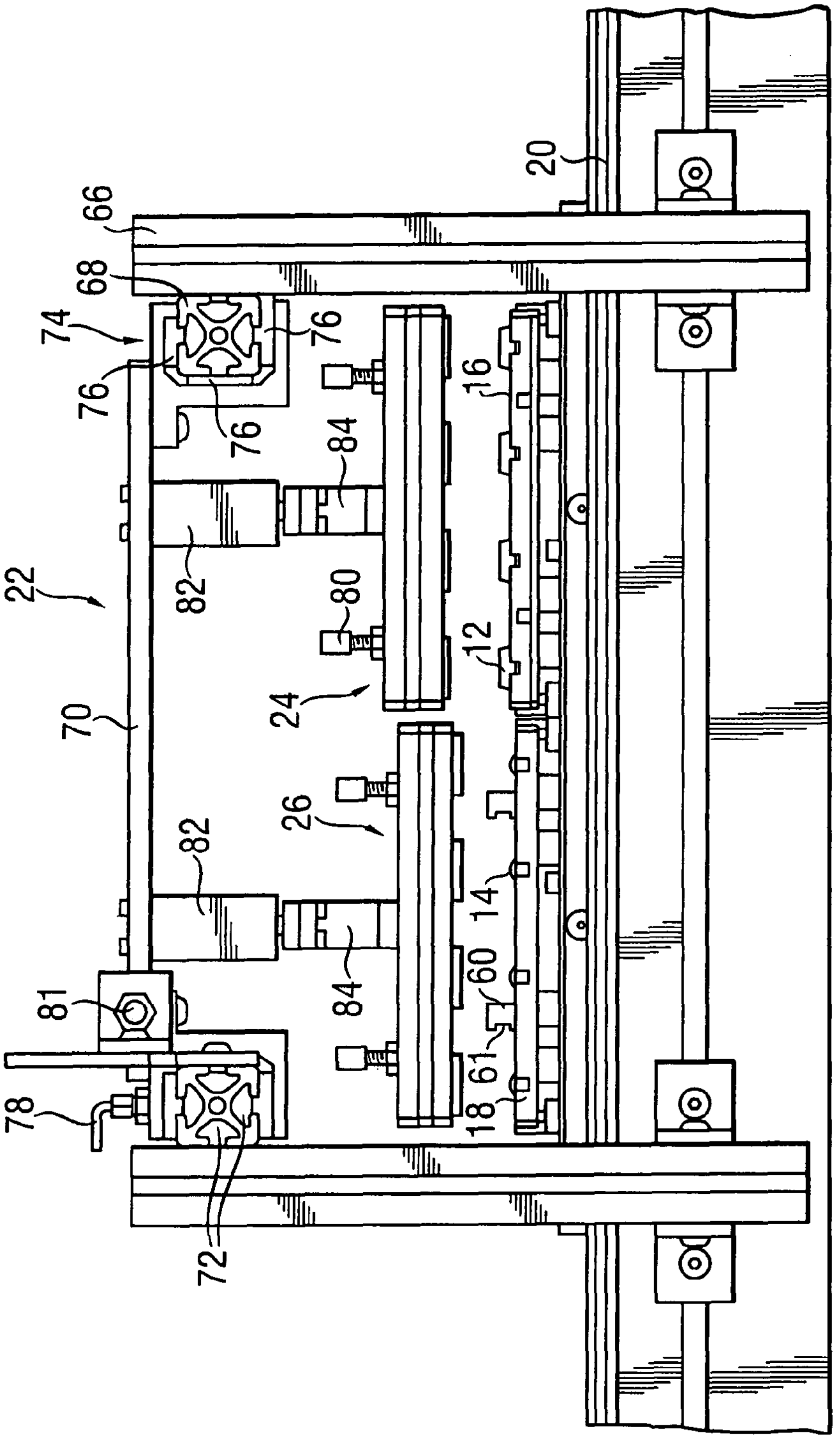
FIG. 6 is an elevation view of the apparatus of FIG. 1 showing the cleaning assemblies positioned over the lens mold carriers.

Referring now to FIG. 1 and FIG. 6, two front curve lens mold carriers 16, each holding eight front curve lens molds, and two base curve lens mold carriers 18, each holding eight lens molds, are transported to a cleaning station 22, by a conveying means 20. At cleaning station 22 the lens mold carriers are positioned under lens mold cleaning assemblies 24 and 26. Cleaning assemblies 24 and 26 are lowered and placed in close proximity to the lens molds which are carried by lens mold carriers 16 and 18. Compressed gas is then blown onto the lens molds to dislodge any debris that may be present, and vacuum is applied to remove any debris. The cleaning assemblies are then retracted and the lens mold carriers proceed to the polymer injection station. The apparatus and process will be discussed in greater detail below.

Front Curve Lens Mold Carriers

Figure 3:
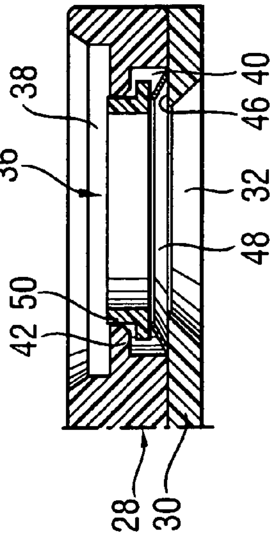
FIG. 3 is a cross-section of the front curve lens mold carrier of FIG. 2 taken along line. 3—3.
Figure 2:
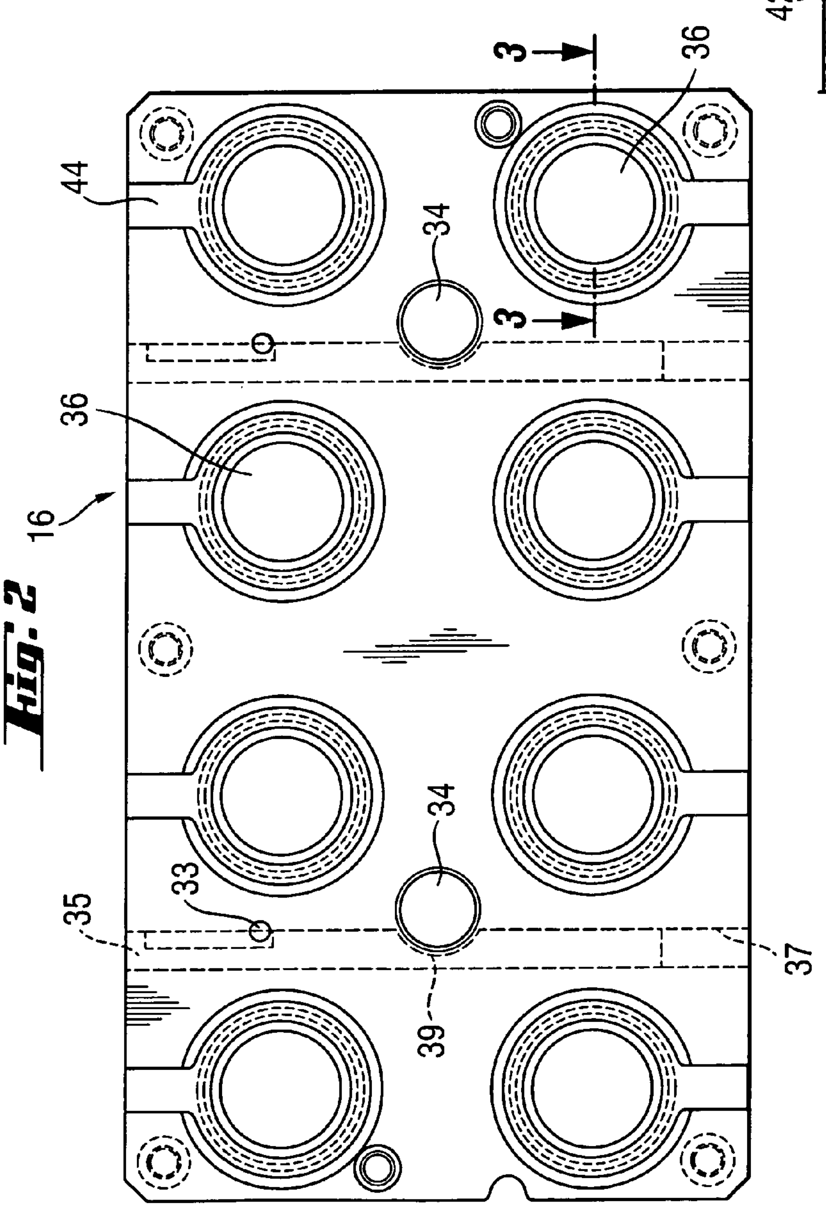
FIG. 2 is a top view of a front curve lens mold carrier.

A front curve lens mold carrier ("front curve carrier") is shown in FIG. 2 and FIG. 3. The front curve carrier 16, consists of two plates; a top plate 28, and a bottom plate 30 which are fixedly attached. Bottom plate 30 contains a plurality of holes 32, which provide fluid communication through bottom plate 30. Bottom plate 30 also contains two receiving slots 34.

Top plate 28 having a top and bottom surface, contains a plurality of holes 36, which provide fluid communication through the top plate 28. Top plate holes 36, are in axial alignment with bottom plate holes 32 thereby providing fluid communication through top plate 28 and bottom plate 30. Top plate holes 36, have a top (or first) section 38, having a first outer diameter and a bottom (or second) section 40, having a second outer diameter smaller than the first outer diameter separated by flange 42. A channel 44, extends from first section 38 to the outer perimeter of top plate 28. Bottom (or second) section 40, of hole 36 is situated beneath flange 42 and abuts hole 32 thereby creating fluid communication through front curve carrier 16. The outer diameter of hole 32 is smaller than the outer diameter of bottom (or second) section 40 thereby creating a ledge 46 at the junction of hole 32 and second section 40. Top plate 28 also contains two receiving slots 34 that are in axial alignment with bottom plate receiving slots 34.

Spring 48 is situated within bottom (or second) section 40 and rests upon ledge 46. A hollow piston 50, is situated in the path of travel created by flange 42. Piston 50 rests upon spring 48 and has freedom of movement through flange 42. In the absence of tension exerted upon the spring, the top of piston 50 rests slightly above the top of flange 42 as shown in FIG. 3. When front curve lens mold carrier 16 joins with base curve carrier 18 during lens formation, FIG. 7, spring 48 creates tension between the front curve mold 12 and the base curve mold 14.

Front curve carrier 16 and base curve carrier 18 are joined by engaging front curve locking bar 35, FIG. 2, with notch 61 in base curve stabilizing member 60, FIG. 7. Front curve locking bar 35 travels in front curve top plate locking bar channel 37 which intersects receiving slots 34. Locking bar 35 contains a semicircular notch 39 with an arc at least equal to that of receiving slot 34. When notch 39 is aligned with receiving slot 34, the front curve assembly is in the "open" position and can receive base curve stabilizing member 60. When stabilizing members 60 are in place, locking bar 35 is moved along locking bar channel 37 such that notch 39 is no longer in alignment with receiving slot 34 thus locking stabilizing member 60 and base curve mold 18 in place. FIG. 7. Locking bar 35 may be moved by exerting force on attached pin 33.

Base Curve Lens Mold Carriers

Figure 4:
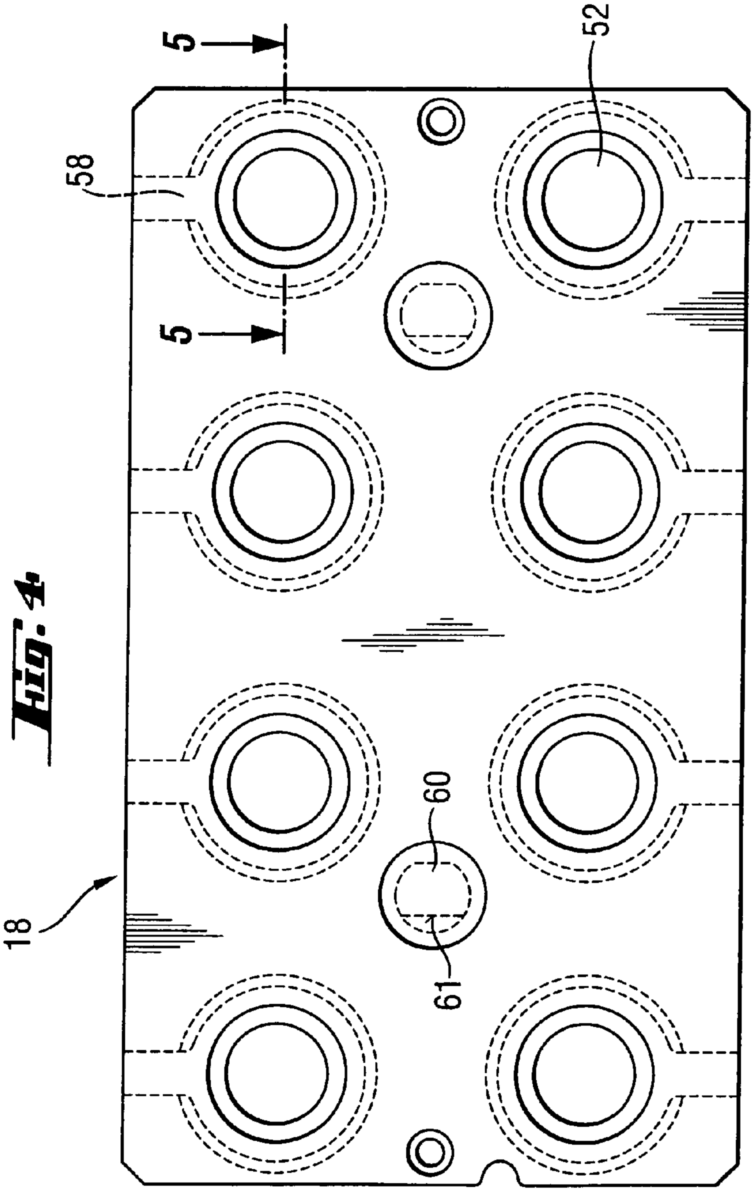
FIG. 4 is a top view of a base curve lens mold carrier.

A base curve lens mold carrier (or base curve carrier) is shown in FIG. 4. The base curve carrier 18, is a solid plate having a top and bottom surface. Base curve carrier 18 contains a plurality of holes 52, which provide fluid communication through base curve carrier 18. Holes 52 are arranged such that they are in axial alignment with holes 36 when base curve carrier 18 joined with front curve carrier 16. FIG. 7.

Figure 5:
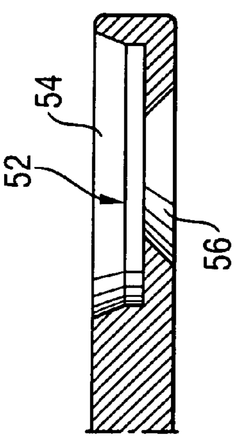
FIG. 5 is cross-section of the base curve lens mold carrier of FIG. 4 taken along line 4—4.

Base curve carrier holes 52, have a top (or first) section 54, having a first outer diameter and a bottom (or second) section 56 having a second outer diameter smaller than said first outer diameter. FIG. 5. A channel 58, extends from first section 54 to the outer perimeter of base curve carrier 18.

Base curve carrier 18 also has two raised stabilizing members 60 which contain notch 61. FIG. 7. Raised stabilizing members 60 are in axial alignment with the receiving slots 34 on front curve carrier 16. As discussed previously, raised stabilizing members 60 engage with receiving slots 34 to form a stable mold during injection and polymerization.

Conveying Means

The conveying device or means 20 could be any type of conveyor or conveyor belt. In a preferred embodiment, shown in FIG. 9, the conveying means consists of a solid pallet upon which the lens mold carriers are secured and a conveyor which transports the lens molds to cleaning station 22 and on to further processing.

The Cleaning Station

The cleaning station 22 has a frame, at least one lens mold cleaning assembly (front curve or base curve), and a means for positioning the lens mold cleaning assembly over the lens mold carriers. In a preferred embodiment, shown in FIG. 1 and FIG. 6, the cleaning station frame comprises four legs 66 placed substantially symmetrically about one point. The legs are spaced apart to form an area between the legs sufficient for a conveyor or other conveying means 20 to pass between and through the legs. Cross support members 68 are attached to the legs 66 and are parallel to one another. A mounting plate 70 is movably attached to the cross support members 68. When connected, the mounting plate 70 the cross support members 68 and the legs 66 form a frame with a generally table like arrangement.

Figure 8:
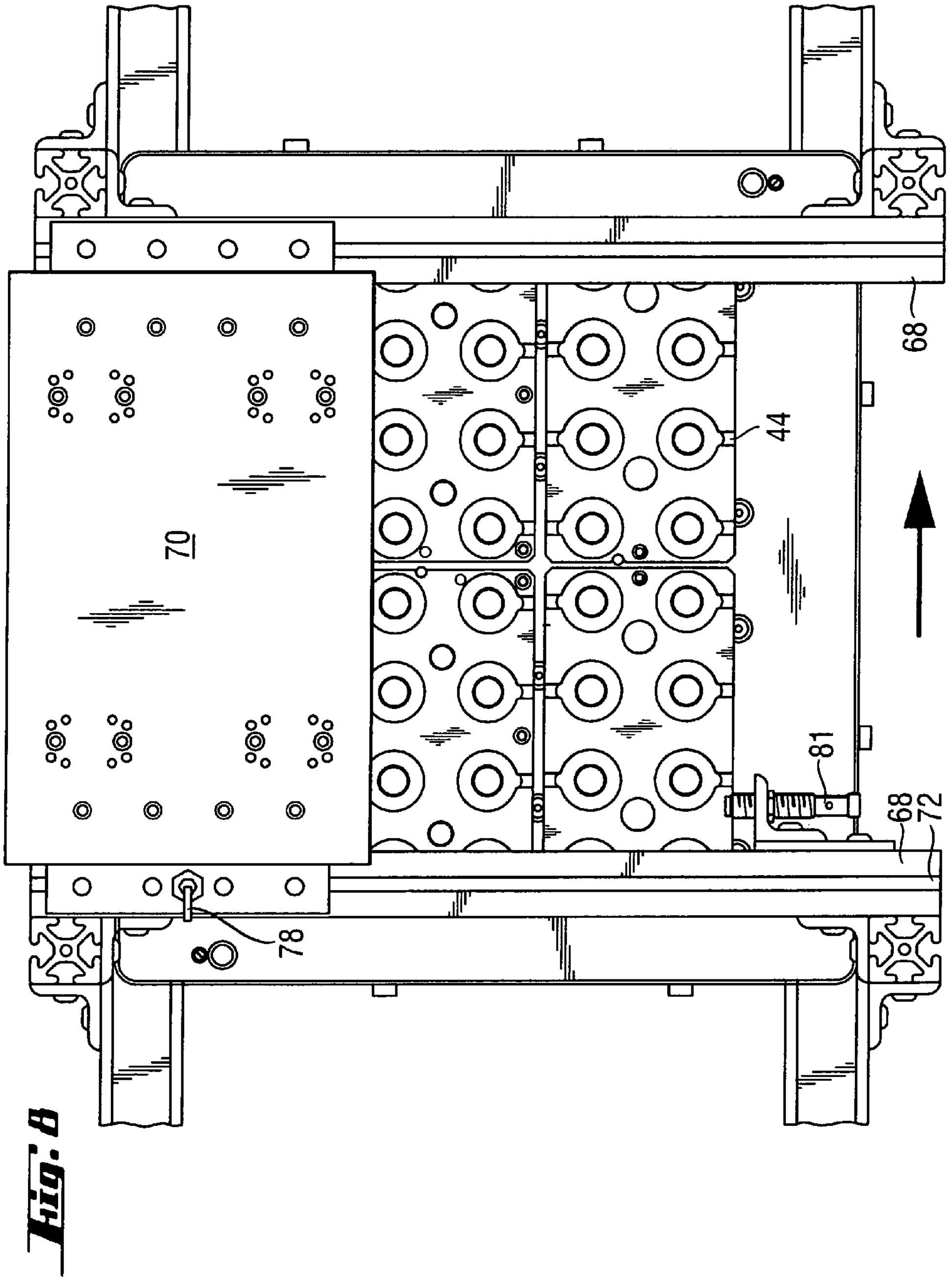
FIG. 8 is a top view of the apparatus of FIG. 1 showing the mounting plate moved to the side.

Cross support members 68 contain grooves 72 which run longitudinally down the length of cross support members 68 allowing the mounting plate 70 to move in a horizontal fashion relative to cross support members 68. In the preferred embodiment shown in FIG. 6, mounting plate 70 is fixedly attached to a bracket and bushing assembly 74 which contains three bushings, 76. The bracket and bushing assembly 74 is attached to the cross support member 68 such that the bushing 76 fits within groove 72. In this manner the mounting plate 70 may move horizontally with respect to cross support members 68 while remaining attached to cross support members 68. FIG. 8. Providing horizontal movement for mounting plate 70 allows easy inspection of the device or lens molds in the event non-optimum operation of the cleaning device is observed. For example, horizontal movement of mounting plate 70 allows an operator access to the mold carriers to-reseat misplaced molds as determined by proximity sensors 80.

At least one securing mechanism 78 is provided to secure the position of the mounting plate 70 with respect to the cross support members 68. The securing mechanism could be a set screw securing the bracket and bushing assembly 74 to the cross support members 68 or any other securing device. In a preferred embodiment shown in FIG. 1 and FIG. 6, the securing mechanism 78 consists of a spring loaded pin that secures mounting plate 70 when pressed down through a hole in cross support member 68. Proximity sensor 81 is employed to ensure that mounting plate 70 is properly aligned and secured before the cleaning station can be activated.

Means For Positioning Mold Cleaning Assemblies

Referring now to FIG. 6 and FIG. 8, attached to the bottom surface of mounting plate 70 are a plurality of means for positioning lens mold cleaning assemblies 82. In the preferred embodiment shown in FIG. 6 and FIG. 8, the means for positioning 82 are four pneumatic cylinders which are attached to a source of compressed gas (not shown). The pneumatic cylinders are arranged substantially symmetrically and attached to the bottom surface of mounting plate 70. Although the preferred embodiment of the invention utilizes pneumatic cylinders, it is to be understood that any means for providing vertical movement such as hydraulic cylinders, electric motors or mechanical hand cranks may be employed.

Front and Base Curve Cleaning Assemblies

Figure 9:
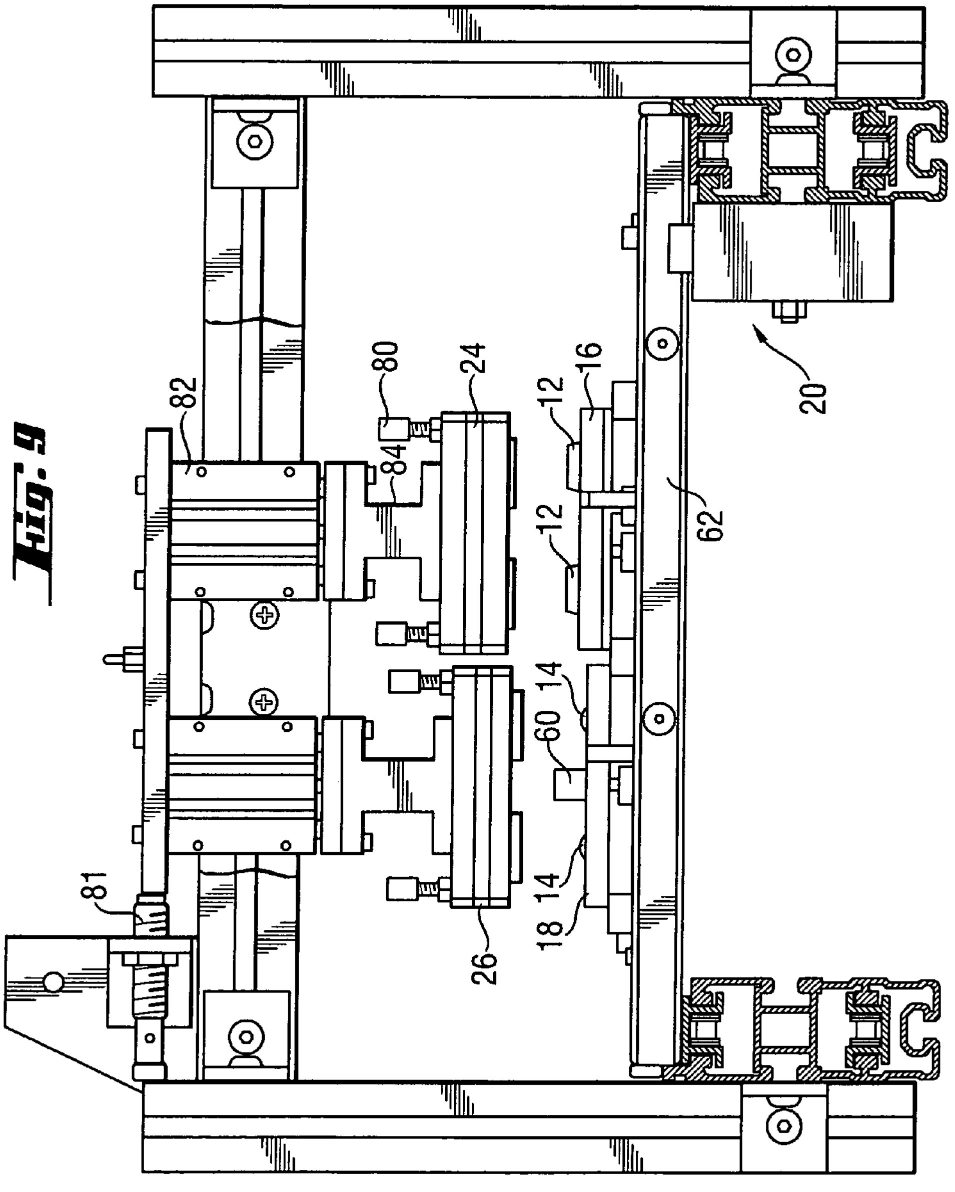
FIG. 9 is an end view of the apparatus of FIG. 1 showing the cleaning assemblies positioned over the lens mold carriers with a portion of a cross support member removed for clarity.

In a preferred embodiment shown in FIG. 1, FIG. 6, and FIG. 9, four cleaning assemblies are shown: two front curve lens mold cleaning assemblies 24 and two base curve lens mold cleaning assemblies 26. Each cleaning assembly is connected to pneumatic cylinders 82 by means of a connector 84. Each front curve and base curve cleaning assembly has three joined plates that allow fluid communication through the plates.

Front Curve Cleaning Assembly

Figure 10:
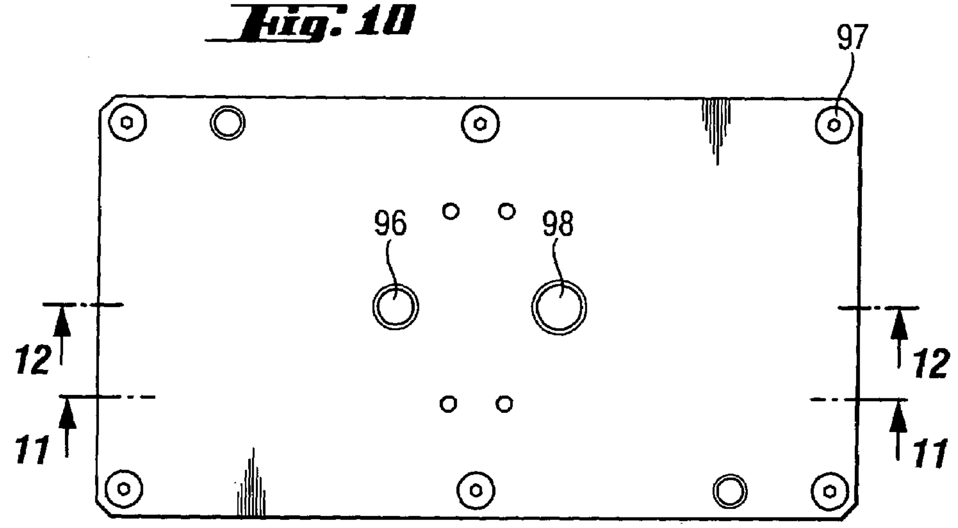
FIG. 10 is a top view of a front curve mold cleaning assembly according to the invention.
Figure 11:
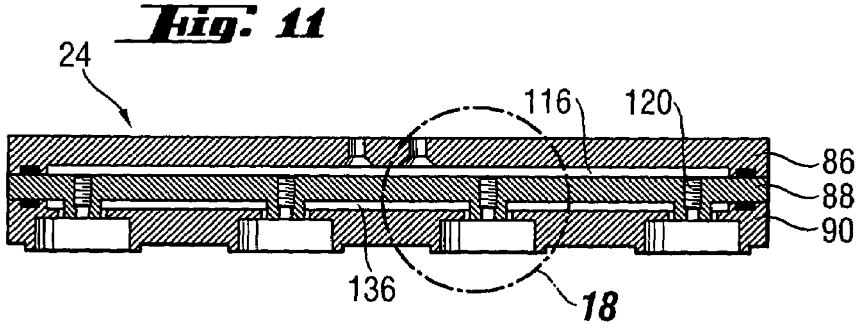
FIG. 11 is a cross-section of the front curve mold cleaning assembly of FIG. 10 taken along line 11—11.
Figure 12:
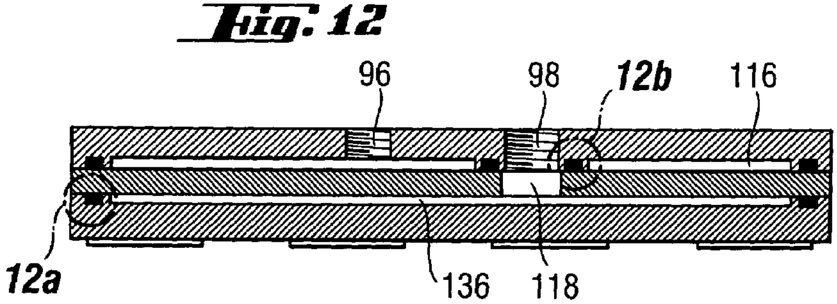
FIG. 12 is a cross-section of the front curve mold cleaning assembly of FIG. 10 taken along line 12—12.
Figure 12A:
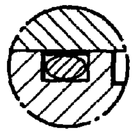
FIGS. 12A and 12B detail sealing devices provided in the front curve mold assembly.
Figure 12B:
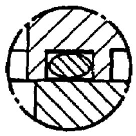

Referring now to FIG. 10, FIG. 11, and FIG. 12, the front curve cleaning assembly 24 is formed by a top plate 86 a middle plate, 88, and a bottom plate 90. The three plates are of approximately equal outer dimension, said dimension being approximately equal to the outer dimension of front curve carrier 16. In a preferred embodiment, the three plates are generally rectangular and of such a size to allow at least eight symmetrically arranged lens molds to fit within its dimensions. In another preferred embodiment, the shape of the outer dimensions of the three plates is square and the size of plates allows at least sixteen symmetrically arranged lens molds to fit within its dimensions. In operation, the three plates are fixedly attached to each other, for example, by screws 97 that are placed at the circumferencial edge of the cleaning assembly.

Figure 14:
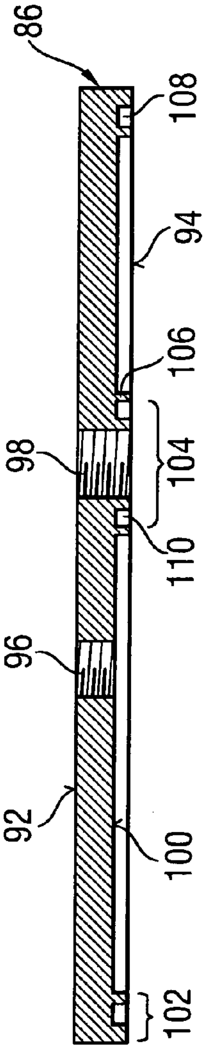
FIG. 14 is a cross-section of the front curve mold cleaning assembly top plate of FIG. 13 taken along line 14—14.
Figure 13:
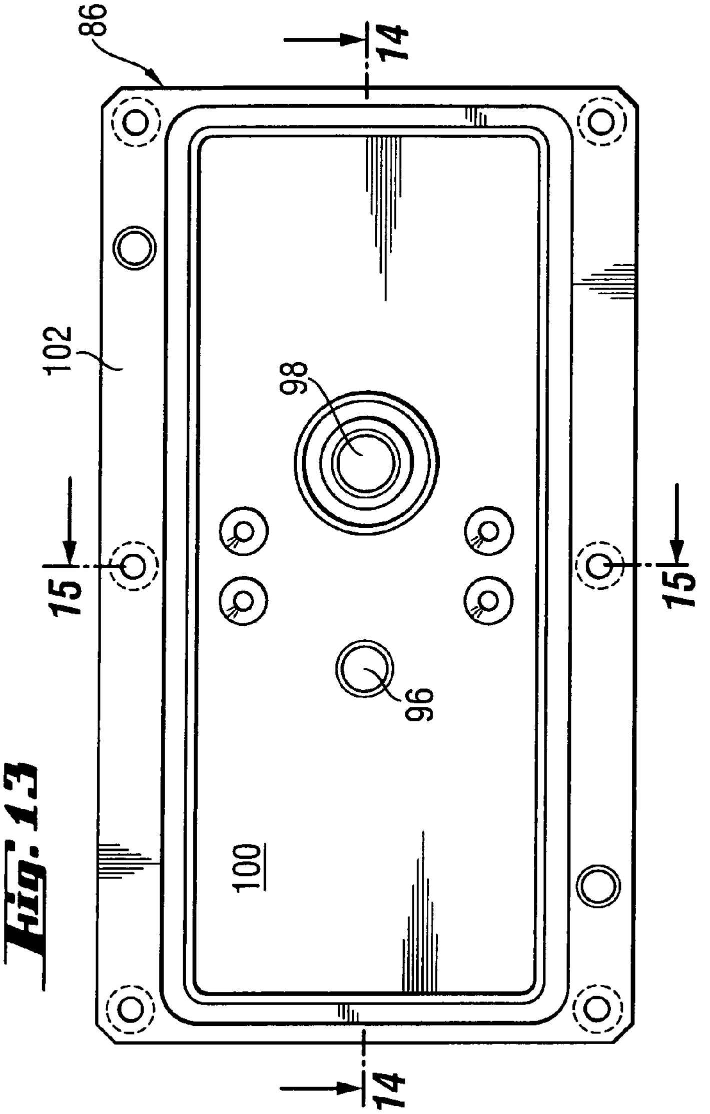
FIG. 13 is a top view of a front curve mold cleaning assembly top plate.
Figure 15:
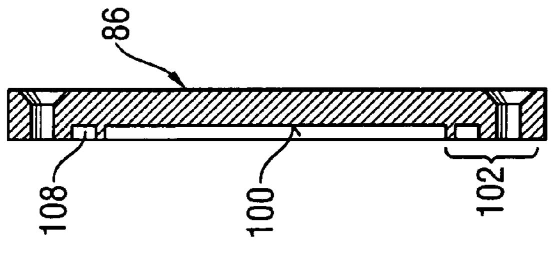
FIG. 15 is a cross-section of the front curve mold cleaning assembly top plate of FIG. 13 taken along line 15—15.

Referring now to FIG. 13, FIG. 14, and FIG. 15, a top plate 86 has a top surface 92, a bottom surface 94, gas injection hole 96 and vacuum hole 98. The top plate 86 is attached to connector 84, as shown in FIG. 9. The bottom surface 94 contains a milled recess 100, and the recess has an outer perimeter generally smaller than and symmetrical with the outer perimeter of said top plate 86, thereby creating an outer ridge 102 along the outer perimeter of the plate. The bottom surface 94 also has a cylindrical island 104, through which vacuum hole 98 passes to form circular ridge 106. Ridges 102 and 106 contain channels 108 and 110 respectively, which accommodate O-rings or some other appropriate sealing device. FIG. 12. The sealing device allows the top plate 86 and the middle plate 88 to be pneumatically sealed.

Gas injection hole 96 establishes fluid communication between front curve top plate top surface 92 and recess 100. Fluid communication between top surface 92 and bottom surface 94 is established by vacuum hole 98.

Figure 16:
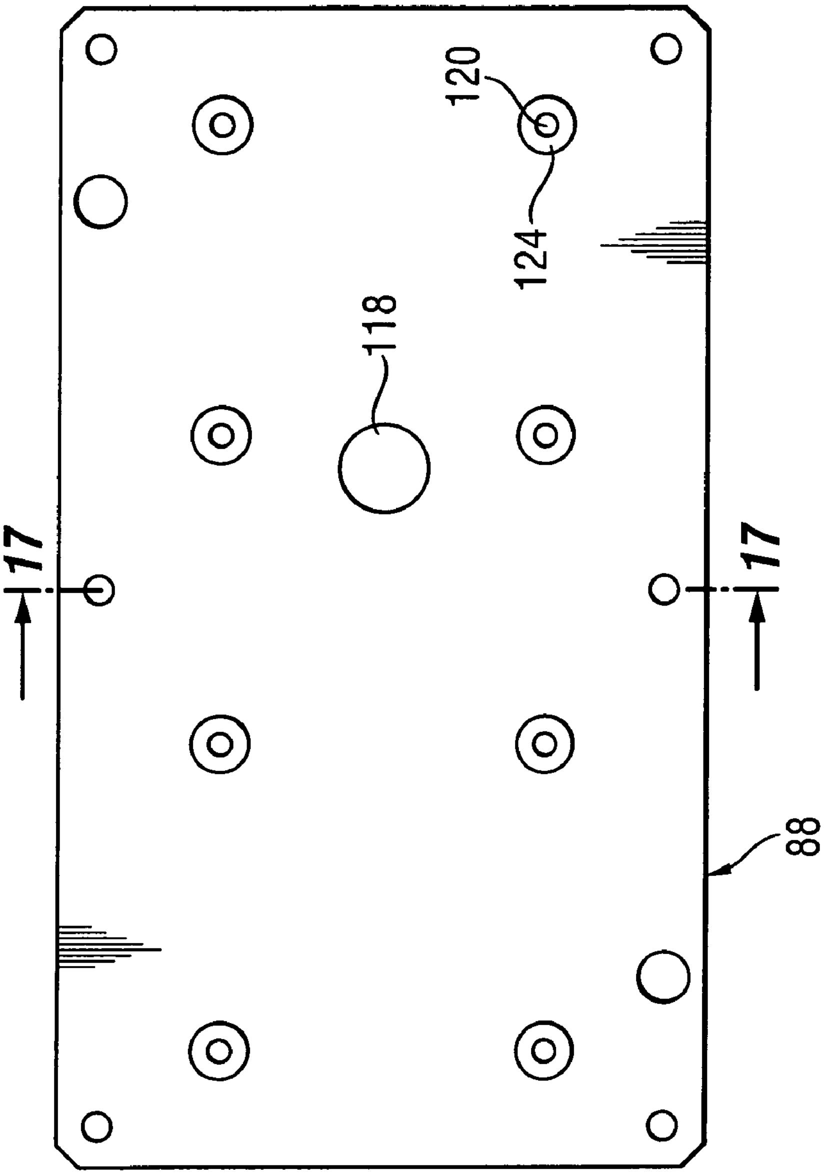
FIG. 16 is top view of a front curve mold cleaning assembly middle plate.
Figure 17:
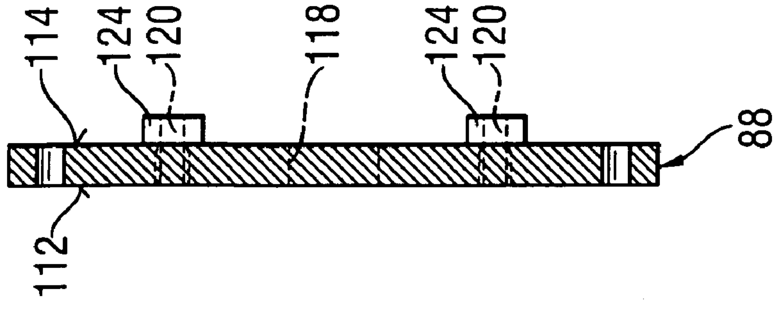
FIG. 17 is a cross-section of the front curve mold cleaning assembly middle plate of FIG. 16 taken along line 17—17.
Figure 18:
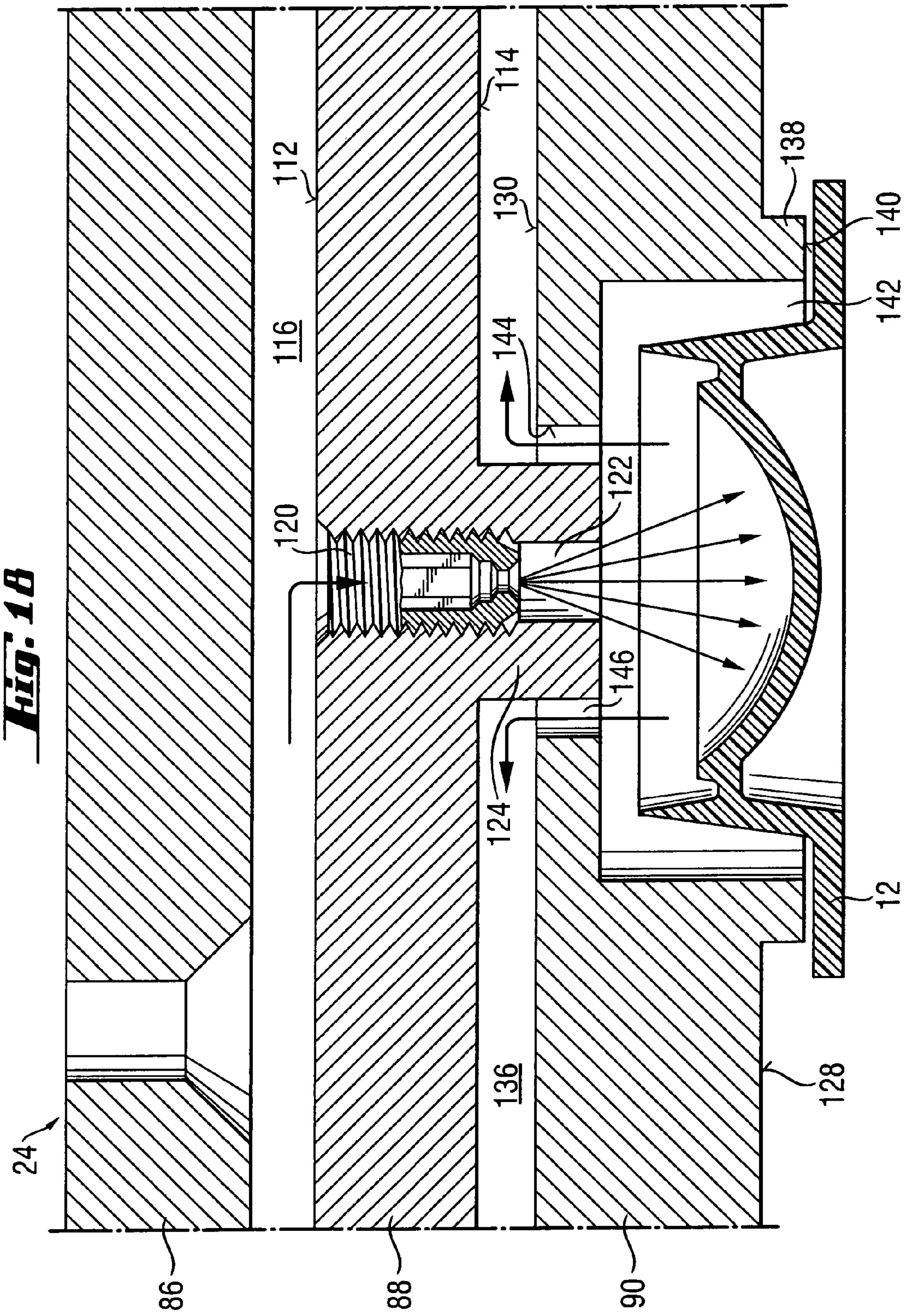
FIG. 18 is a detailed view of the front curve mold cleaning assembly of FIG. 11 showing channels of fluid communication.

Referring now to FIG. 11, FIG. 16 and FIG. 17, a front curve middle plate 88 having a top surface 112 and bottom surface 114 is attached to front curve top plate 86 thereby forming a cavity 116 defined by middle plate top surface 112 and the recess 100 of top plate 86. FIG. 10 and FIG. 18. O-rings or some other appropriate sealing device seal cavity 116. Front curve middle plate 88 contains a hole 118 in axial alignment with top plate vacuum hole 98 and of approximately the same diameter as top plate vacuum hole 98. Hole 118 and vacuum hole 98 provide fluid communication between the top surface of the top plate 92 and the bottom surface of the middle plate 114.

The front curve middle plate 88 also contains a plurality of orifices 120 providing fluid communication between cavity 116 and middle plate bottom surface 114. In a preferred embodiment, there are eight orifices 120 which are arranged symmetrically. The orifices 120 preferably contain a nozzle 122 or other means to direct the flow of gas through orifice 120. FIG. 11 and FIG. 18. Annular extensions 124 which are in axial alignment with orifices 120 and which have an inner diameter approximately equal to the diameter of orifices 120 extend from the middle plate bottom surface 114. Nozzle 122 and annular extensions 124 direct the flow of compressed gas to the lens molds. FIG. 18.

Figure 20:
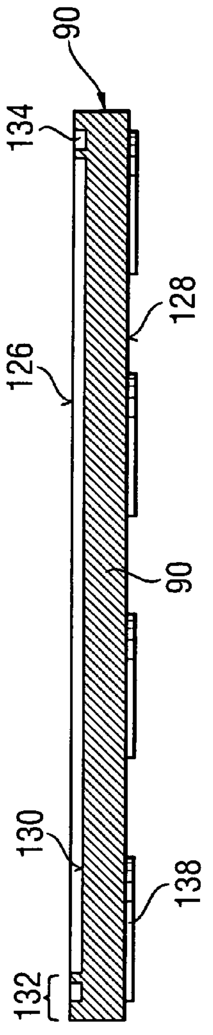
FIG. 20 is a cross-section of the front curve mold cleaning assembly bottom plate of FIG. 19 taken along line 20—20.
Figure 19:
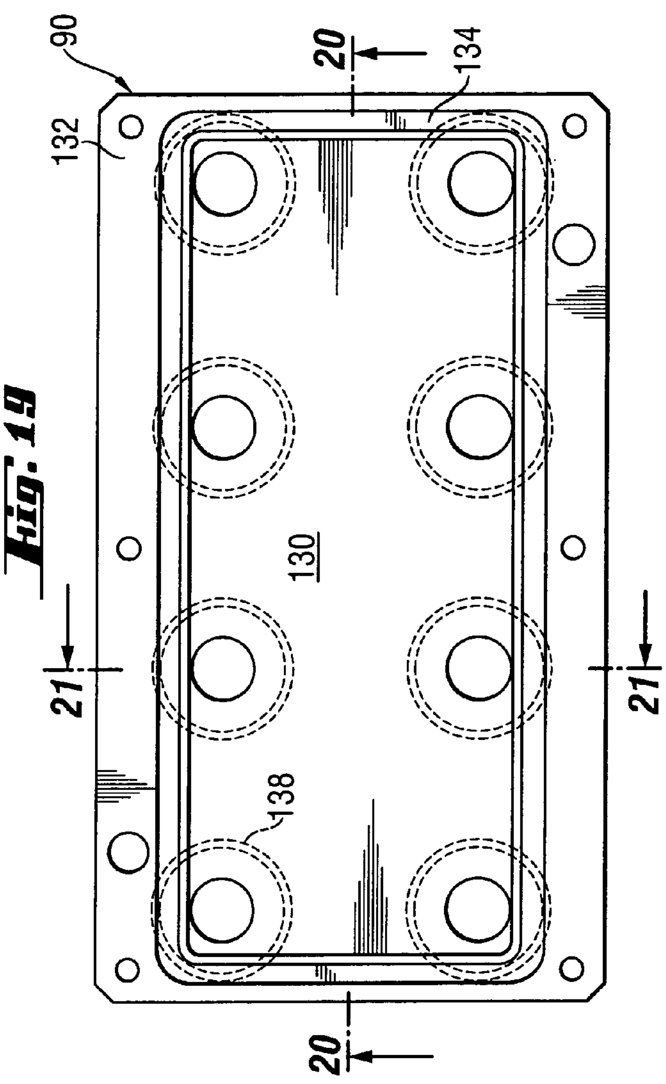
FIG. 19 is a top view of a front curve cleaning mold assembly bottom plate.
Figure 21:
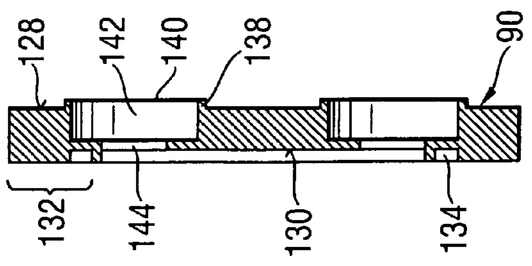
FIG. 21 is a cross-section of the front curve mold cleaning assembly bottom plate of FIG. 19 taken along line 21—21.
Figure 22:
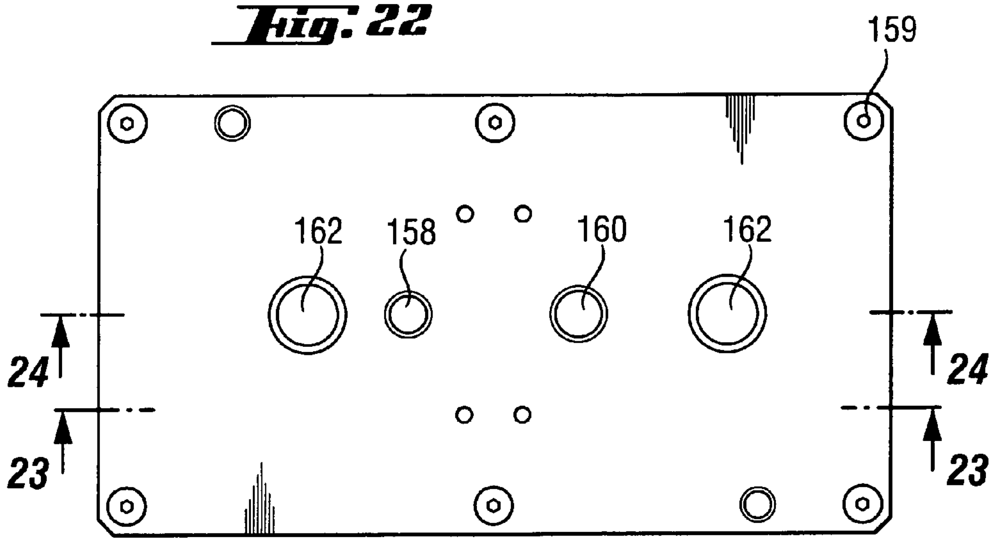
FIG. 22 is a top view of a base curve mold cleaning assembly according to the invention.

Referring now primarily to FIG. 19, FIG. 20, and FIG. 21, a front curve bottom plate 90 having a top surface 126 and a bottom surface 128 is attached to front curve middle plate 88. FIG. 11. The top surface 126 contains a recess 130 having an outer perimeter generally smaller than and symmetrical with the outer perimeter of the bottom plate 90 thereby creating an outer ridge 132 along the outer perimeter of the plate. Ridge 132 contains channel 134 which accommodates an O-ring or other sealing device. FIG. 12. The sealing device pneumatically seals the bottom plate and the middle plate when the plates are assembled. When front curve bottom plate 90 is attached to front curve middle plate 88, a cavity 136 as shown in FIG. 11, FIG. 12 and FIG. 18 is created by recess 130 and middle plate bottom surface 114.

Referring now to FIG. 18, front curve bottom plate bottom surface 128 contains a plurality of raised cylindrical portions 138 having an inner diameter and an outer diameter thereby defining a cylindrical ridge 140 and a cylindrical wall of a recess 142, situated within cylindrical portion 138. Optionally, a sealing means, especially an elastomeric sealing means, e.g., o-ring, is attached to the cylindrical ridge 140, especially at the bottom thereof. Recess 142 extends to a point intermediate top surface 126 and bottom surface 128. In a preferred embodiment, shown in FIG. 20 and FIG. 21, there are eight raised cylindrical portions 138 symmetrically arranged and in axial alignment with front curve middle plate orifices 120.

A second cylindrical recess 144 having a diameter smaller than the diameter of cylindrical recess 142 extends downward from the bottom of recess 130. Second cylindrical recess 144 is axially aligned with cylindrical recess 142 and is in fluid communication with cavity 136 and cylindrical recess 142. Second cylindrical recess 144 is of sufficient diameter to allow middle plate annular extension 124 to substantially occupy recess 144 thereby defining an annular space 146. Annular space 146 maintains fluid communication between cylindrical recess 142 and cavity 136. FIG. 18.

Operation of the Front Curve Mold Cleaning Assembly

In operation, the front curve mold cleaning assemblies 24 and front curve lens mold carriers 16 are arranged so that cylindrical recesses 142 are in axial alignment with front curve lens mold carrier top plate holes 36. The front curve cleaning assembly 24 is lowered by positioning means 82 to place the ridge 140 close to the flange of the lens mold 12, e.g., approximately 15/1,000 of an inch from the base of a front curve lens mold, thereby forming a substantially enclosed area. FIG. 18. Alternatively, especially when the ridge 140 is equipped with sealing means, the front curve cleaning assembly 24 is lowered to place the sealing means of the ridge 140 on the flange of the lens mold 12, thereby pneumatically sealing the lens mold 12 and the cylindrical recess 142.

Two channels of fluid communication into cylindrical recess 142 are present. The first channel includes hole 96, cavity 116, orifices 120, and annular extensions 124. The first channel allows an inflow of compressed gas at greater than atmospheric pressure from an outside source (not shown) into cylindrical recess 142 to dislodge any debris residing on the lens mold. The desirable flow rate and/or pressure of the gas impinging on the lens mold may be varied depending on, for example, the effectiveness of the system at removing contaminants. Preferably, the gas is supplied to the cleaning assembly at a pressure of about 15 psi to about 25 psi, more preferably about 20 psi. The compressed gas is filtered before it is applied on the mold to ensure that the gas does not introduce external particulate matters. Gases suitable for the invention include nitrogen, carbon dioxide and air, and desirably, the gas is deionized. FIG. 18. The second channel of fluid communication is under the influence of a vacuum source or any other device that provides an outflow of gas. Preferably, the outflow device applies between about 1.0 inch of Hg and about 2.0 inches of Hg, more preferably about 1.5 inches of Hg, of vacuum force at the vacuum hole 98 of the cleaning assembly. The second channel is used to remove the gas and debris located in recess 142. Beginning with recess 142, the gas and any debris present leave recess 142 via annular space 146 and proceed through cavity 136, through middle plate vacuum hole 118 and out top plate vacuum hole 98 into a vacuum line (not shown). Gas injection and application of the vacuum can occur independently, simultaneously or sequentially and can be of variable duration. For example, the vacuum is applied first and then quickly the pressurized gas is applied to ensure that all the debris located on the lens mold and in the recess 142 is removed through the annular space 146.

Base Curve Cleaning Apparatus

Referring now to FIG. 9, FIG. 22, FIG. 23, and FIG. 24, the base curve cleaning assembly 26 is formed by a top plate 148, a middle plate 150, and a bottom plate 152. The three plates are of approximately equal outer dimension, said dimension being approximately equal to the outer dimension of the base curve lens mold carrier 18. In a preferred embodiment, the plates are generally rectangular and of such a size to allow at least eight symmetrically arranged lens molds to fit within its dimensions. In another preferred embodiment, the shape of the outer dimensions of the plates is square, and the size of plates allows at least sixteen symmetrically arranged lens molds to fit within its dimensions. In operation, the three plates are fixedly attached to each other, for example, by screws 159 that are placed at the circumferencial edge of the cleaning assembly.

Figure 24:
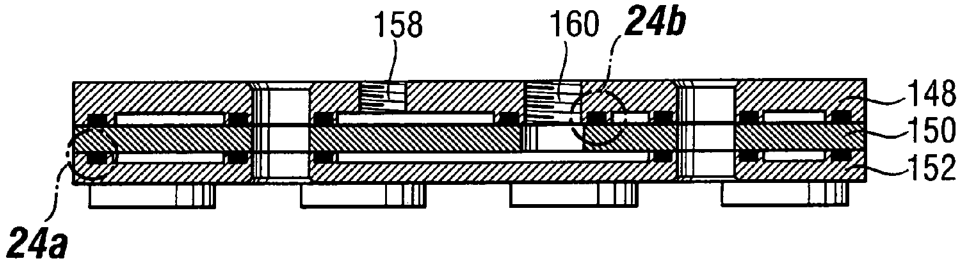
FIG. 24 is a cross-section of the base curve mold cleaning assembly of FIG. 22 taken along line 24—24.
Figure 24A:
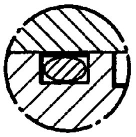
FIGS. 24A and 24B detail sealing devices provided in the base curve mold assembly.
Figure 24B:
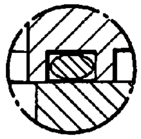
Figure 26:
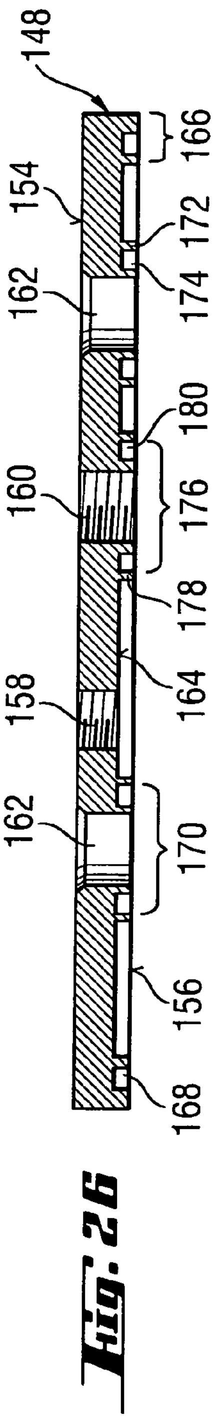
FIG. 26 is a cross-section of the base curve mold cleaning assembly top plate of FIG. 25 taken along line 26—26.
Figure 25:
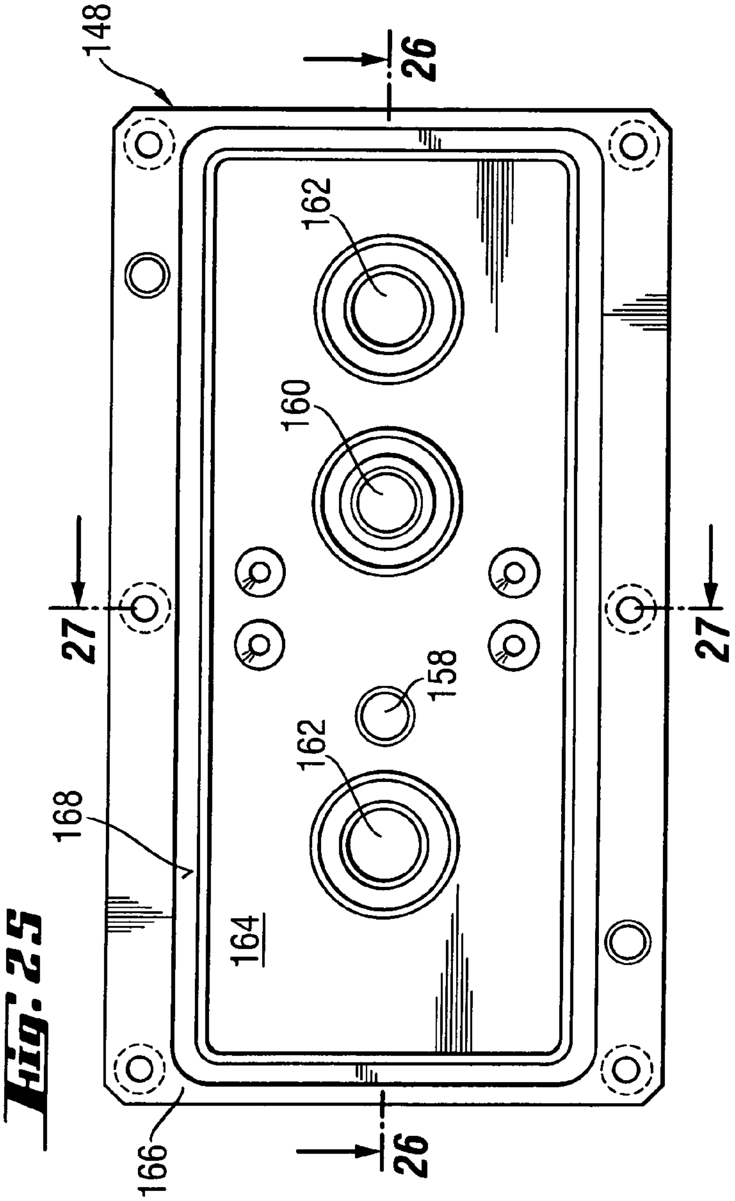
FIG. 25 is a top view of a base curve mold cleaning assembly top plate.
Figure 27:
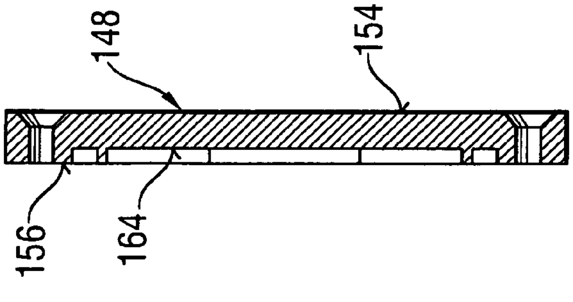
FIG. 27 is a cross-section of the base curve mold cleaning assembly top plate of FIG. 25 taken along line 27—27.

Referring now to FIG. 25, FIG. 26, and FIG. 27, a top plate 148 has a top surface 154, a bottom surface 156, gas injection hole 158, vacuum hole 160, and receiving slots 162. The top plate 148 is attached to a connector 84. The bottom surface 156 contains a milled recess 164, having an outer diameter generally smaller than and symmetrical with the outer perimeter of the top plate 148, thereby creating a ridge 166 along the outer perimeter of the plate. Ridge 166 contains channel 168 which houses an o-ring or other appropriate sealing device. FIG. 24. Again, the sealing device forms a pneumatic seal to allow the inflow and outflow of gas are routed through the intended channels when the plates are assembled. The recess also contains raised cylindrical portions 170 and 176 situated in the central portion of bottom surface 156. Raised cylindrical portions 170 house receiving slots 162 thereby creating cylindrical ridges 172 which contain channels 174. Channels 174 house o-rings or other appropriate sealing devices. FIG. 26.

Raised cylindrical portion 176 houses vacuum hole 160 thereby creating cylindrical ridge 178 which contains channel 180. Channel 180 houses an o-ring or other appropriate sealing device. FIG. 24.

Figure 28:
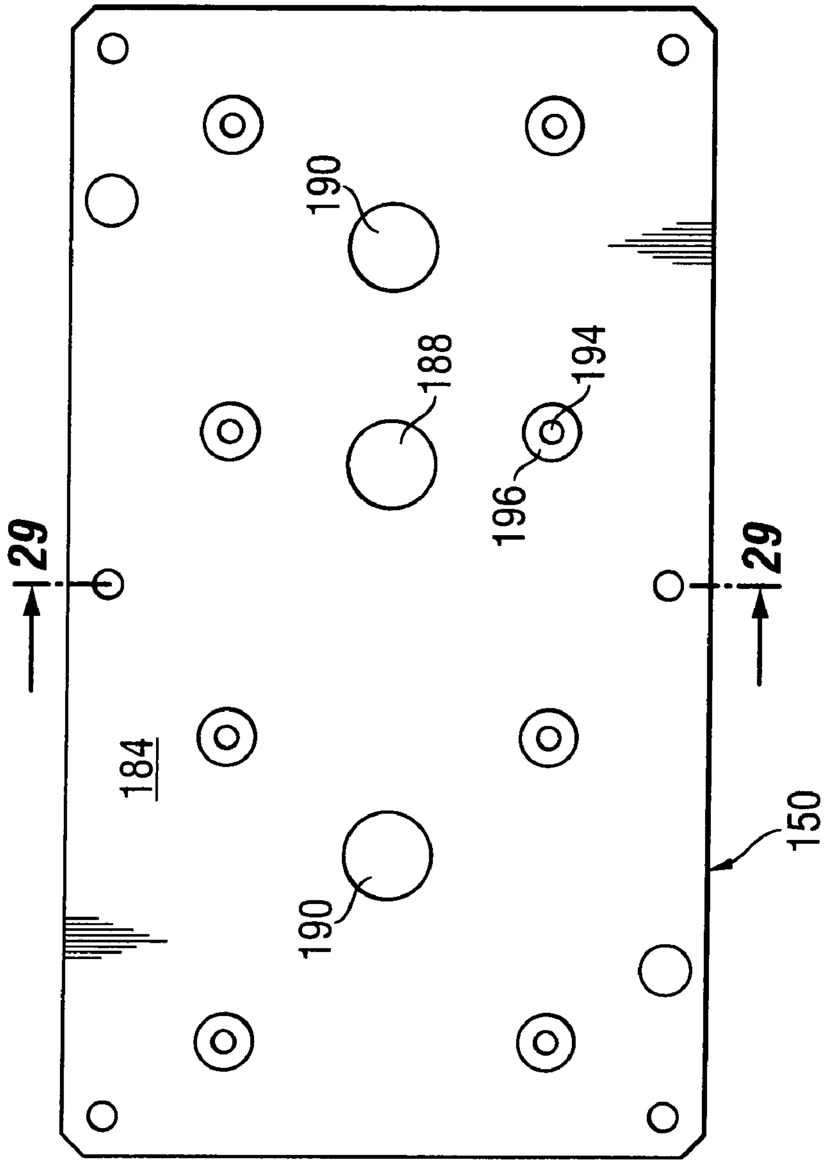
FIG. 28 is a top view of a base curve mold cleaning assembly middle plate.
Figure 29:
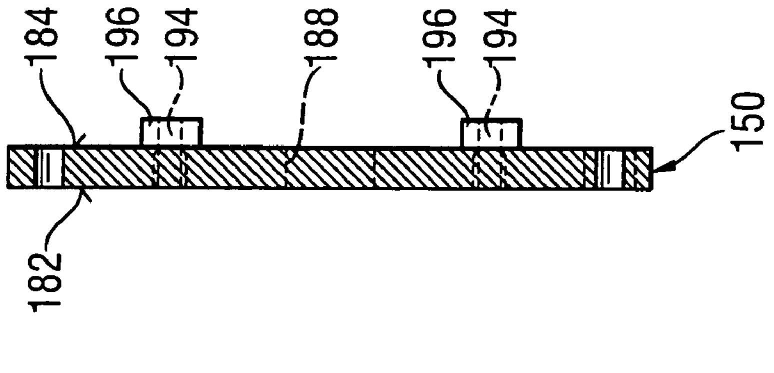
FIG. 29 is a cross-section of the base curve mold cleaning assembly middle plate of FIG. 28 taken along line 29—29.

Referring now to FIG. 28 and FIG. 29, a base curve middle plate, 150, having a top surface 182 and bottom surface 184 is attached to the base curve top plate 148, thereby forming a cavity 186 defined by middle plate top surface 182 and top plate recess 164. Base curve middle plate 150 contains a hole 188 in axial alignment with base curve vacuum hole 160 and of approximately the same diameter as vacuum hole 160. Hole 188 and vacuum hole 160 establish fluid communication between the top surface of the base curve top plate 154 and the bottom surface of the base curve middle plate 184. Base curve middle plate 150 also contains two holes or receiving slots 190 that are in axial alignment and of approximately the same diameter as top plate receiving slots 162.

Figure 33:
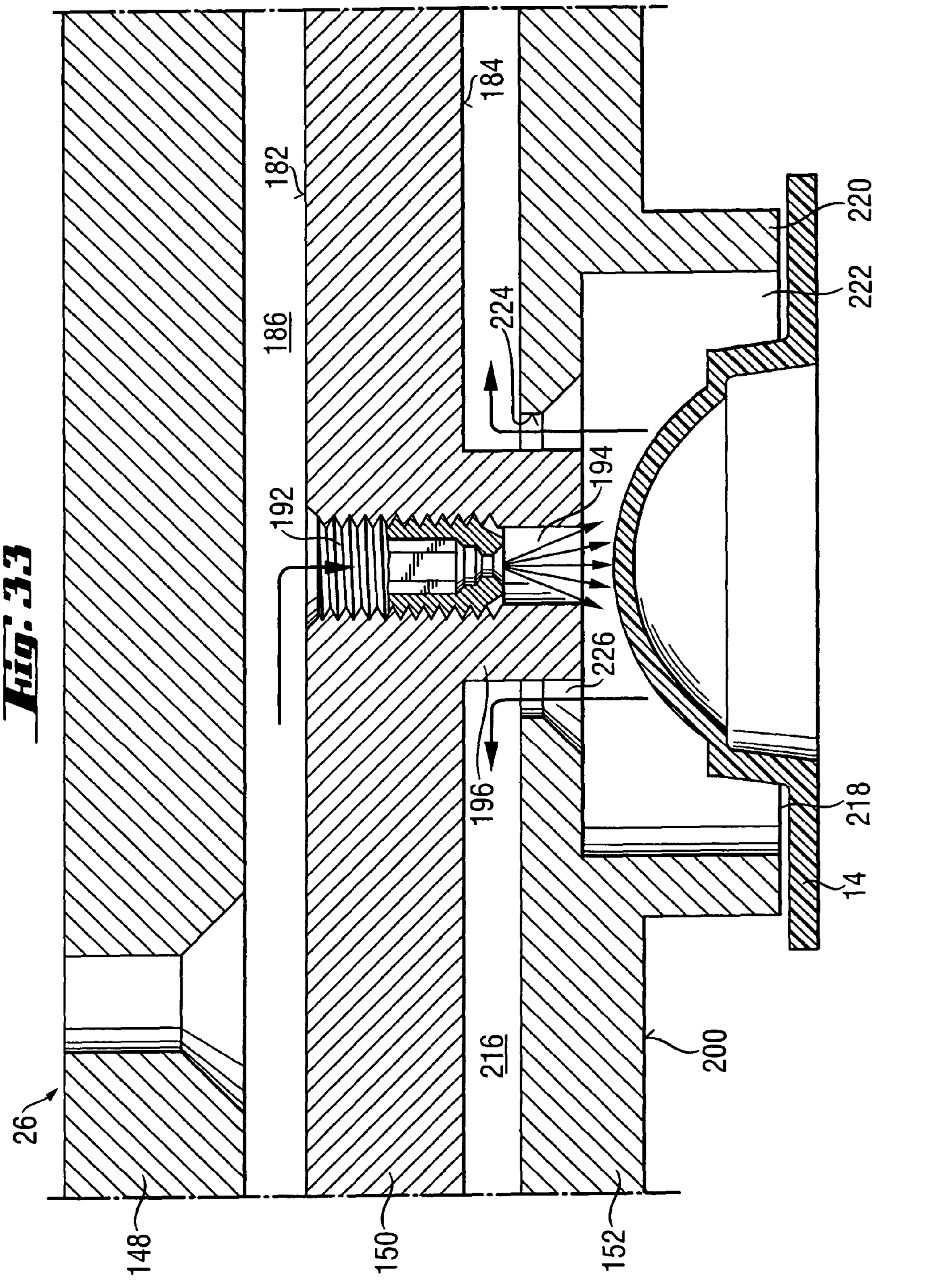
FIG. 33 is a detailed view of the base curve mold cleaning assembly of FIG. 23 showing channels of fluid communication.

The base curve middle plate 150 also contains a plurality of orifices 192 providing fluid communication between cavity 186 and middle plate bottom surface 184. In a preferred embodiment, there are eight orifices 192 which are arranged symmetrically. Orifices 192 preferably contain a nozzle 194, or other means to direct the flow of gas through orifice 192, which provides an inflow of compressed gas onto the lens mold that is to be cleaned. FIG. 33. Annular extensions 196 which are in axial alignment with orifices 192 and which have an inner diameter approximately equal to the diameter of orifices 192 extend from the middle plate bottom surface 184.

Figure 23:
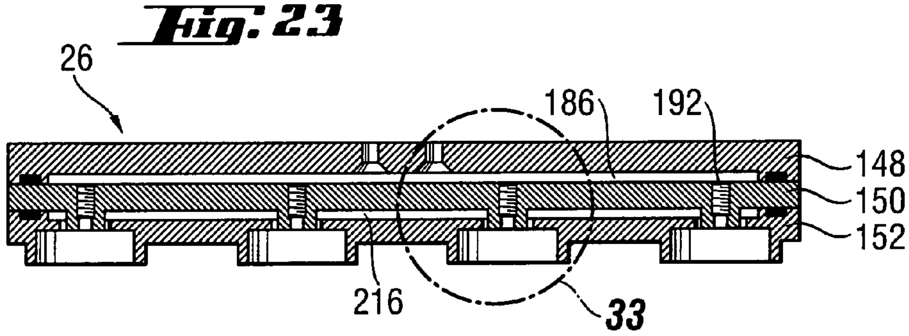
FIG. 23 is a cross-section of the base curve mold cleaning assembly of FIG. 22 taken along line 23—23.
Figure 31:
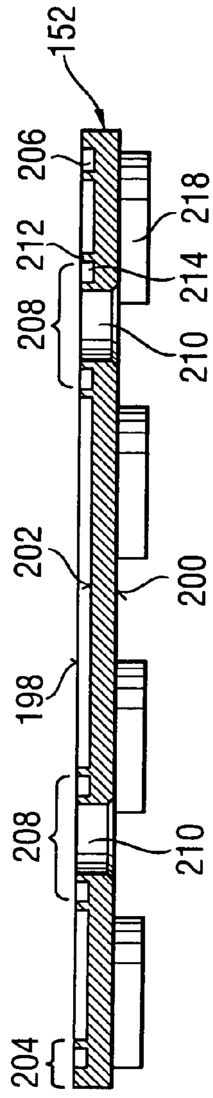
FIG. 31 is a cross-section of the base curve mold cleaning assembly bottom plate of FIG. 30 taken along line 31—31.
Figure 30:
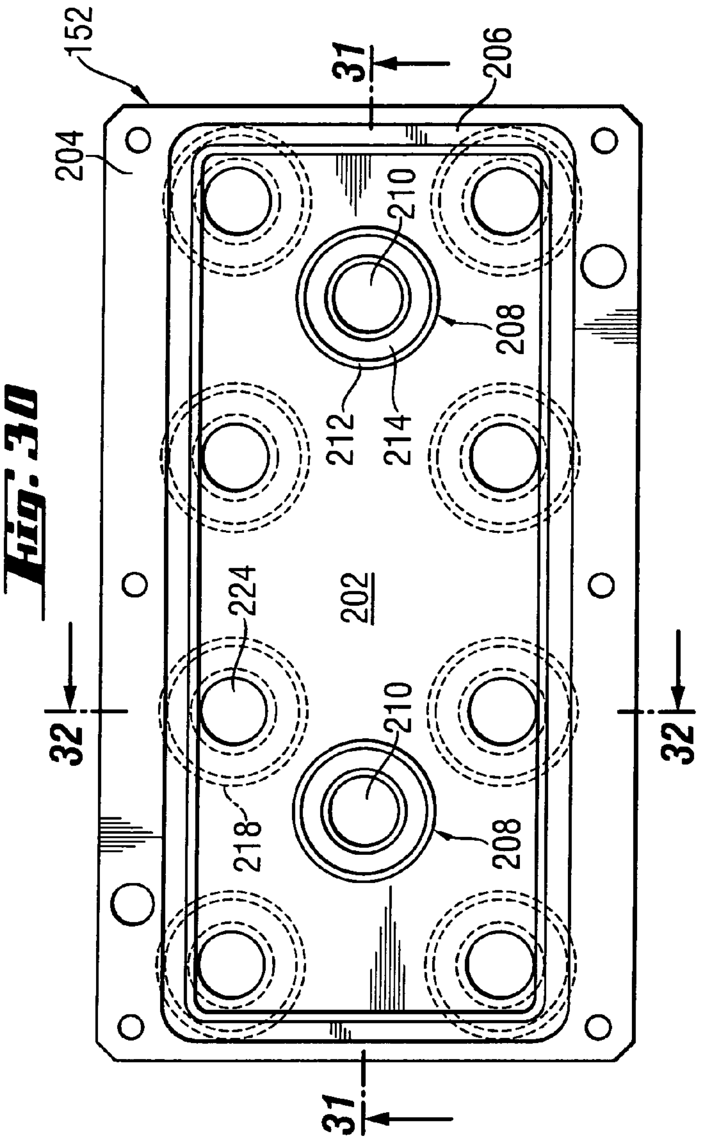
FIG. 30 is a top view of a base curve mold cleaning assembly bottom plate.
Figure 32:
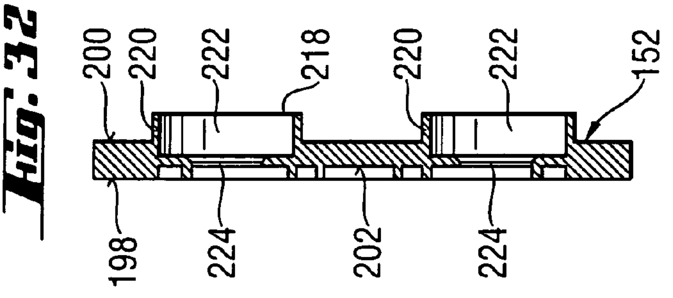
FIG. 32 is a cross-section of the base curve mold cleaning assembly bottom plate of FIG. 30 taken along line 32—32.

Referring now primarily to FIG. 30, FIG. 31, and FIG. 32, a base curve bottom plate 152 having a top surface 198 and a bottom surface 200 is attached to base curve middle plate 150. FIG. 23. The top surface 198 contains a recess 202 having an outer perimeter generally smaller than and symmetrical with the outer perimeter of the plate thereby creating an outer ridge 204. Outer ridge 204 contains a channel 206 which houses an o-ring. FIG. 24. Within recess 202 are two raised cylindrical portions 208 which house receiving slots 210 thereby creating cylindrical ridges 212. Ridges 212 contain channels 214, which house o-rings. FIG. 23. When base curve bottom plate 152 is attached to base curve middle plate 150, a cavity 216, as shown in FIG. 23 is created by recess 202, and middle plate bottom surface 184.

Base curve bottom plate bottom surface, 200, contains a plurality of raised cylindrical portions 218 having an inner diameter and an outer diameter thereby defining a cylindrical ridge 220 and the cylindrical wall of a recess 222 having a definite depth situated within cylindrical portion 218. Optionally, a sealing means, especially an elastomeric sealing means, e.g., o-ring, is attached to the cylindrical ridge 220, especially at the bottom thereof. Cylindrical recess 222 extends upward into base curve bottom plate 152 to a point intermediate top surface 198 and bottom surface 200. In a preferred embodiment shown in FIG. 30, there are eight cylindrical portions 218 symmetrically arranged and in axial alignment with base curve middle plate orifices 192.

A second cylindrical recess 224 having a diameter smaller than the diameter of cylindrical recess 222 extends downward from the bottom of recess 202 and is axially aligned with cylindrical recess 222 and establishes fluid communication between recess 202 and cylindrical recess 222. Second cylindrical recess 224 is of sufficient diameter to allow middle plate annular extensions 196 to substantially occupy recess 222 thereby defining an annular space 226. Annular space 226 maintains fluid communication between cylindrical recess 222 and cavity 216.

Operation of the Base Curve Cleaning Assembly

In operation, base curve mold cleaning assemblies 26 and base curve lens mold carriers 18 are arranged so that cylindrical recesses 222 are in substantially axial with base curve carrier holes 52. The base curve cleaning assembly 26 is lowered by positioning means 82 to place ridge 218 close to the flange of the lens mold, e.g., approximately $^{15}/_{1,000}$ of an inch above the base of the lens mold, thereby forming a substantially enclosed area. FIG. 33. Alternatively, especially when the ridge 218 is equipped with sealing means, the base curve mold cleaning assembly 26 is lowered to place the sealing means of the ridge 218 on the flange of the lens mold, thereby pneumatically sealing the lens mold and the cylindrical recess 222. Two channels of fluid communication are created. The first channel consisting of hole 158, cavity 186, orifices 192 and annular extensions 196 allow compressed gas to flow at greater than atmospheric pressure from an outside source (not shown) into cylindrical recess 222 to dislodge any debris residing on the lens mold. Preferably, the gas is supplied to the cleaning assembly at a pressure of about 15 psi to about 25 psi, more preferably about 20 psi. Gases suitable for the invention include nitrogen, carbon dioxide and air, and desirably the gas is deionized. This flow of gas is shown schematically in FIG. 23 and FIG. 33.

The second channel of fluid communication is under the influence of a vacuum and provides an outflow of gas. Preferably, the outflow device applies between about 1.0 inch of Hg and about 2.0 inches of Hg, more preferably about 1.5 inches of Hg, of vacuum force at the vacuum hole 160 of the cleaning assembly. The channel is used to remove the gas and debris located around the lens mold. Beginning with recess 222, the gas and any debris present leave cylindrical recess 222 via annular space 226 and proceed through cavity 216 through middle plate hole 188 and out top plate vacuum hole 160 into a vacuum line (not shown). Again, gas injection and application of the vacuum can occur independently, simultaneously or sequentially and can be of variable duration. For example, the vacuum is applied first and then quickly the pressurized gas is applied to ensure that all the debris located on the lens mold and in the recess 222 is removed through the annular space 226.

After the lens molds are cleaned the lens molds proceed to subsequent stations in the lens manufacturing process.

The invention has been described in detail, with reference to certain preferred embodiments, in order to enable the reader to practice the invention without undue experimentation. However, a person having ordinary skill in the art will readily recognize that many of the components and parameters may be varied or modified to a certain extent without departing from the scope and spirit of the invention. Furthermore, titles, headings, or the like are provided to enhance the reader's comprehension of this document, and should not be read as limiting the scope of the present invention. Accordingly, the intellectual property rights to the invention are defined only by the following claims and reasonable extensions and equivalents thereof.

What is claimed is:

1. A cleaning apparatus for a lens mold half having a flange, comprising a cleaning assembly which includes a gas inlet, a gas outlet, and a surface having a cylindrical recess for accommodating the lens mold and a raised cylindrical portion surrounding the recess, wherein the recess has a cylindrical wall and a bottom surface, wherein the raised cylindrical portion having an inner diameter and an outer diameter thereby defining a ridge, wherein the ridge, in operation, is placed close to the flange so that a substantially enclosed area is formed between the cleaning assembly and said lens mold with the lens mold being situated within the substantially enclosed area, wherein the outlet is in fluid communication with the recess for an outflow of gas from the substantially enclosed area, wherein the inlet is in fluid communication with the recess and arranged coaxially with the cylindrical recess for injecting an inflow of compressed gas onto the lens mold to dislodge any debris residing on the lens mold.

2. The cleaning apparatus according to claim 1 wherein said lens mold is carried by a mold carrier, which holds a plurality of lens molds.

3. The cleaning apparatus according to claim 1, wherein the ridge is equipped with sealing means for pneumatically sealing the lens mold and the cylindrical recess.

4. The cleaning apparatus according to claim 1 wherein said compressed gas is filtered air.

5. The cleaning apparatus according to claim 1 wherein said outflow is provided by a vacuum source.

* * * * *